US010415832B2

(12) United States Patent
Lee

(10) Patent No.: US 10,415,832 B2
(45) Date of Patent: Sep. 17, 2019

(54) MULTI-SWIRLER FUEL/AIR MIXER WITH CENTRALIZED FUEL INJECTION

(71) Applicant: Woodward, Inc., Fort Collins, CO (US)

(72) Inventor: Fei Philip Lee, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 199 days.

(21) Appl. No.: 15/339,463

(22) Filed: Oct. 31, 2016

(65) Prior Publication Data

US 2017/0299184 A1 Oct. 19, 2017

Related U.S. Application Data

(63) Continuation of application No. 14/076,902, filed on Nov. 11, 2013, now Pat. No. 9,482,433.

(51) Int. Cl.
*F23R 3/28* (2006.01)
*F23R 3/14* (2006.01)

(52) U.S. Cl.
CPC ............... *F23R 3/286* (2013.01); *F23R 3/14* (2013.01); *Y02T 50/675* (2013.01)

(58) Field of Classification Search
CPC .... F23R 3/12; F23R 3/14; F23R 3/343; F23R 3/286
See application file for complete search history.

(56) References Cited

U.S. PATENT DOCUMENTS

| 3,283,802 | A | * | 11/1966 | Couvelas | ............... | F23D 23/00 |
| | | | | | | 431/13 |
| 3,763,650 | A | * | 10/1973 | Hussey | ............... | F23D 11/104 |
| | | | | | | 239/561 |
| 3,905,192 | A | | 9/1975 | Pierce et al. | | |
| 5,197,290 | A | | 3/1993 | Lee et al. | | |
| 5,333,459 | A | | 8/1994 | Berger | | |
| 5,343,693 | A | | 9/1994 | Komatsu et al. | | |
| 5,373,693 | A | | 12/1994 | Zarzalis et al. | | |
| 5,417,054 | A | | 5/1995 | Lee et al. | | |
| 5,490,378 | A | | 2/1996 | Berger et al. | | |
| 5,505,045 | A | | 4/1996 | Lee et al. | | |

(Continued)

FOREIGN PATENT DOCUMENTS

| CN | 1715745 A | 1/2006 |
| CN | 101069040 A | 11/2007 |

(Continued)

OTHER PUBLICATIONS

Office Action issued in Chinese Application No. 201480072856.8 dated Apr. 13, 2017; 9 pages.

(Continued)

*Primary Examiner* — Carlos A Rivera
(74) *Attorney, Agent, or Firm* — Fish & Richardson P.C.

(57) ABSTRACT

A gas turbine combustor assembly has a fuel/air mixer assembly with a plurality of fuel/air mixer elements. Each fuel/air mixer element defines an air flow passage therethrough. A fuel injector is coupled to the fuel/air mixer assembly. The fuel injector has a tip portion with a plurality of fuel outlets arranged to direct fuel into the air flow passages of the air/fuel mixer elements. Each of the fuel/air mixer elements has at least one outlet arranged to supply fuel to the element.

20 Claims, 12 Drawing Sheets

(56) References Cited

U.S. PATENT DOCUMENTS

| | | | |
|---|---|---|---|
| 5,572,862 A * | 11/1996 | Mowill | F02C 9/50 |
| | | | 431/188 |
| 5,573,395 A * | 11/1996 | Althaus | F23D 11/402 |
| | | | 431/175 |
| 5,647,538 A * | 7/1997 | Richardson | F23D 11/101 |
| | | | 239/405 |
| 5,664,412 A | 9/1997 | Overton | |
| 5,749,219 A | 5/1998 | DuBell | |
| 5,836,163 A * | 11/1998 | Lockyer | F23D 11/107 |
| | | | 60/737 |
| 5,836,164 A | 11/1998 | Tsukahara et al. | |
| 5,930,999 A * | 8/1999 | Howell | F23D 11/107 |
| | | | 239/402 |
| 6,089,170 A * | 7/2000 | Conti | F23C 7/004 |
| | | | 110/262 |
| 6,199,367 B1 | 3/2001 | Howell | |
| 6,530,223 B1 | 3/2003 | Dodds et al. | |
| 6,623,267 B1 * | 9/2003 | Golladay, Jr. | F23D 14/02 |
| | | | 14/2 |
| 7,200,986 B2 | 4/2007 | Sanders | |
| 7,302,801 B2 | 12/2007 | Chen | |
| 7,415,826 B2 | 8/2008 | McMasters et al. | |
| 7,500,347 B2 | 3/2009 | Sanders et al. | |
| 7,762,073 B2 * | 7/2010 | Li | F23R 3/14 |
| | | | 60/734 |
| 7,827,795 B2 | 11/2010 | Hicks et al. | |
| 7,832,377 B2 | 11/2010 | Lee et al. | |
| 8,001,761 B2 * | 8/2011 | Myers, Jr. | F02C 9/28 |
| | | | 60/39.281 |
| 8,205,643 B2 | 6/2012 | Lee et al. | |
| 8,234,873 B2 | 8/2012 | Houtman et al. | |
| 8,522,555 B2 * | 9/2013 | Berry | F23R 3/286 |
| | | | 60/746 |
| 9,188,341 B2 | 11/2015 | McMasters et al. | |
| 2007/0028620 A1 | 2/2007 | McMasters et al. | |
| 2007/0074452 A1 | 4/2007 | Yates | |
| 2008/0163627 A1 | 7/2008 | Elkady et al. | |
| 2009/0031728 A1 | 2/2009 | Milura et al. | |
| 2010/0051724 A1 | 3/2010 | Hicks et al. | |
| 2011/0056205 A1 | 3/2011 | Carroni | |
| 2012/0031097 A1 | 2/2012 | McMahan | |
| 2012/0234013 A1 * | 9/2012 | Overman | F23C 9/006 |
| | | | 60/772 |
| 2013/0036741 A1 * | 2/2013 | Prociw | F23R 3/346 |
| | | | 60/746 |
| 2013/0174571 A1 * | 7/2013 | Abe | F02C 9/26 |
| | | | 60/776 |

FOREIGN PATENT DOCUMENTS

| | | |
|---|---|---|
| CN | 101294714 | 10/2008 |
| CN | 102927592 A | 2/2013 |
| EP | 2415993 | 2/2012 |
| EP | 2458284 | 5/2012 |
| EP | 2557362 | 2/2013 |
| EP | 2626635 | 8/2013 |
| JP | H0518537 | 1/1993 |
| WO | WO2010128882 | 11/2010 |

OTHER PUBLICATIONS

Lee et al., "Gas Turbine Engine Flow Regulating", PCT Application Serial No. PCT/US13/46413, filed Jun. 18, 2013, 25 pages.

Lee, "Combustor with Staged, Axially Offset Combustion", U.S. Appl. No. 14/167,594, filed Jan. 29, 2014, 23 pages.

PCT International Search Report and Written Opinion of the International Searching Authority, PCT/US2014/064736, dated Jul. 24, 2015, 11 pages.

PCT International Preliminary Report on Patentability, PCT/US2014/064736, dated May 26, 2016, 7 pages.

Notice of Allowance issued in Chinese Application No. 201480072856.8 dated Sep. 25, 2017; 5 pages.

European Communication pursuant to Article 94(3) in European Application No. 14864990.8, dated Jun. 28, 2018, 4 pages.

* cited by examiner

MULTI-SWIRLER FUEL/AIR MIXER WITH CENTRALIZED FUEL INJECTION

CROSS-REFERENCE TO RELATED APPLICATIONS

This application is a continuation application of and claims the benefit of priority to U.S. application Ser. No. 14/076,902, filed on Nov. 11, 2013, the contents of which are hereby incorporated by reference.

BACKGROUND

The gas turbine engine is the preferred class of internal combustion engine for many high power applications. Fundamentally, the gas turbine engine features an upstream rotating compressor coupled to a downstream turbine, and a combustion chamber in-between. The combustion chamber can include multiple mixers to mix fuel and air prior to combustion. Typically, each mixer requires an individual fuel injector tip to spray the fuel into the mixer's airflow.

DESCRIPTION OF DRAWINGS

Like reference symbols in the various drawings indicate like elements.

DETAILED DESCRIPTION

Figure 1:
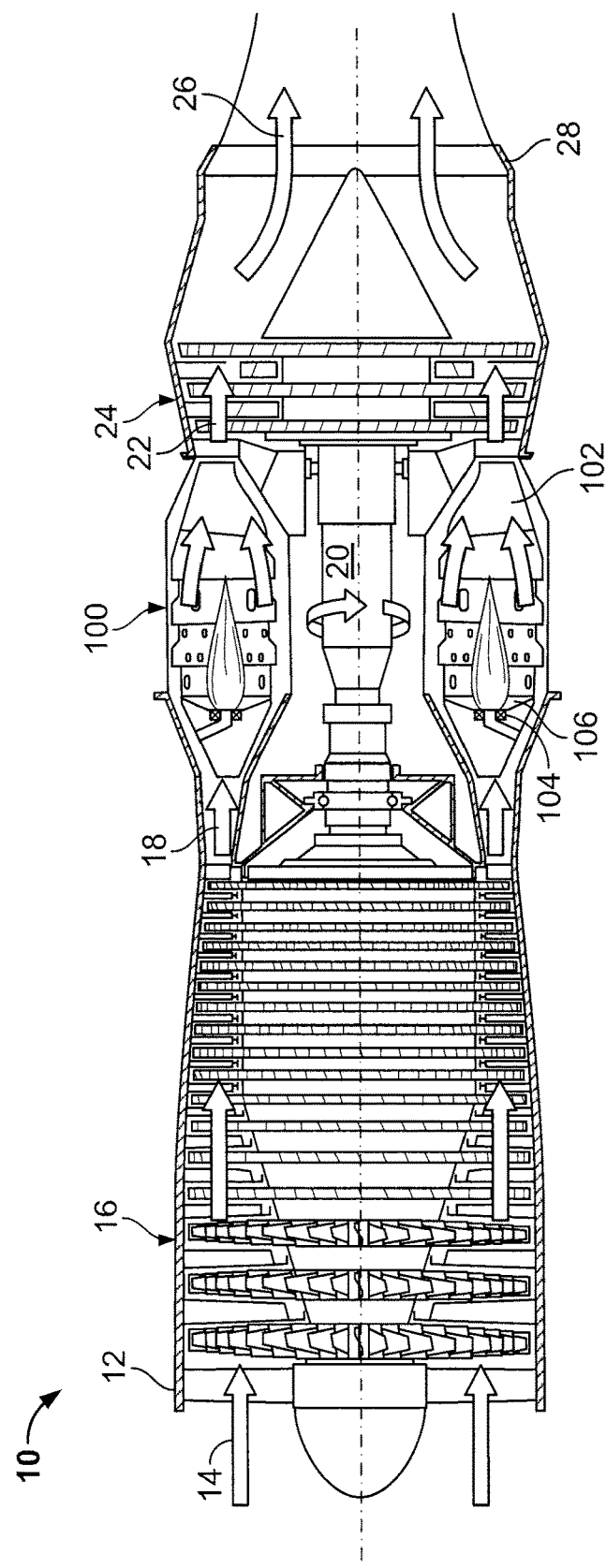
FIG. 1 is a half, side cross-sectional view of an example gas turbine engine.

FIG. 1 is a half, side cross-sectional view of an example gas turbine engine 10. The gas turbine engine 10 is turbojet-type gas turbine that could be used, for example, to power jet aircraft. However, the concepts described in the present disclosure are not so limited, and can be incorporated in the design of various other types of gas turbine engines (e.g., turbofan, turboprop, turboshaft, industrial/marine engines or others).

As shown, the gas turbine engine 10 generally facilitates a continuous axial flow of gas. That is, gas generally flows through the engine 10 in the axially downstream direction indicated by the arrows in FIG. 1. The gas turbine engine 10 includes an intake 12 that receives ambient air 14 and directs the ambient air to a compressor 16. The ambient air 14 is drawn through multiple stages of the compressor 16. High-pressure air 18 exiting the compressor 16 is introduced to a combustor 100. In certain instances the combustor 100 is an annular combustor circumscribing the engine's main shaft 20 or a can-type combustor positioned radially outward of the shaft.

The combustor 100 includes a combustion shield 102, multiple fuel injectors 104, and a combustor dome 106. At the combustor 100, the high-pressure air 18 is mixed with liquid hydrocarbon fuel (not shown) and ignited to produce heated combustion products 22. The combustion products 22 are passed through multiple stages of a turbine 24. The turbine 24 extracts energy from the high-pressure, high-temperature combustion products 22. Energy extracted from the combustion products 22 by the turbine 24 drives the compressor 16, which is coupled to the turbine by the main shaft 20. Exhaust gas 26 leaving the turbine 24 is accelerated into the atmosphere through an exhaust nozzle 28 to provide thrust or propulsion power.

Figure 2A:
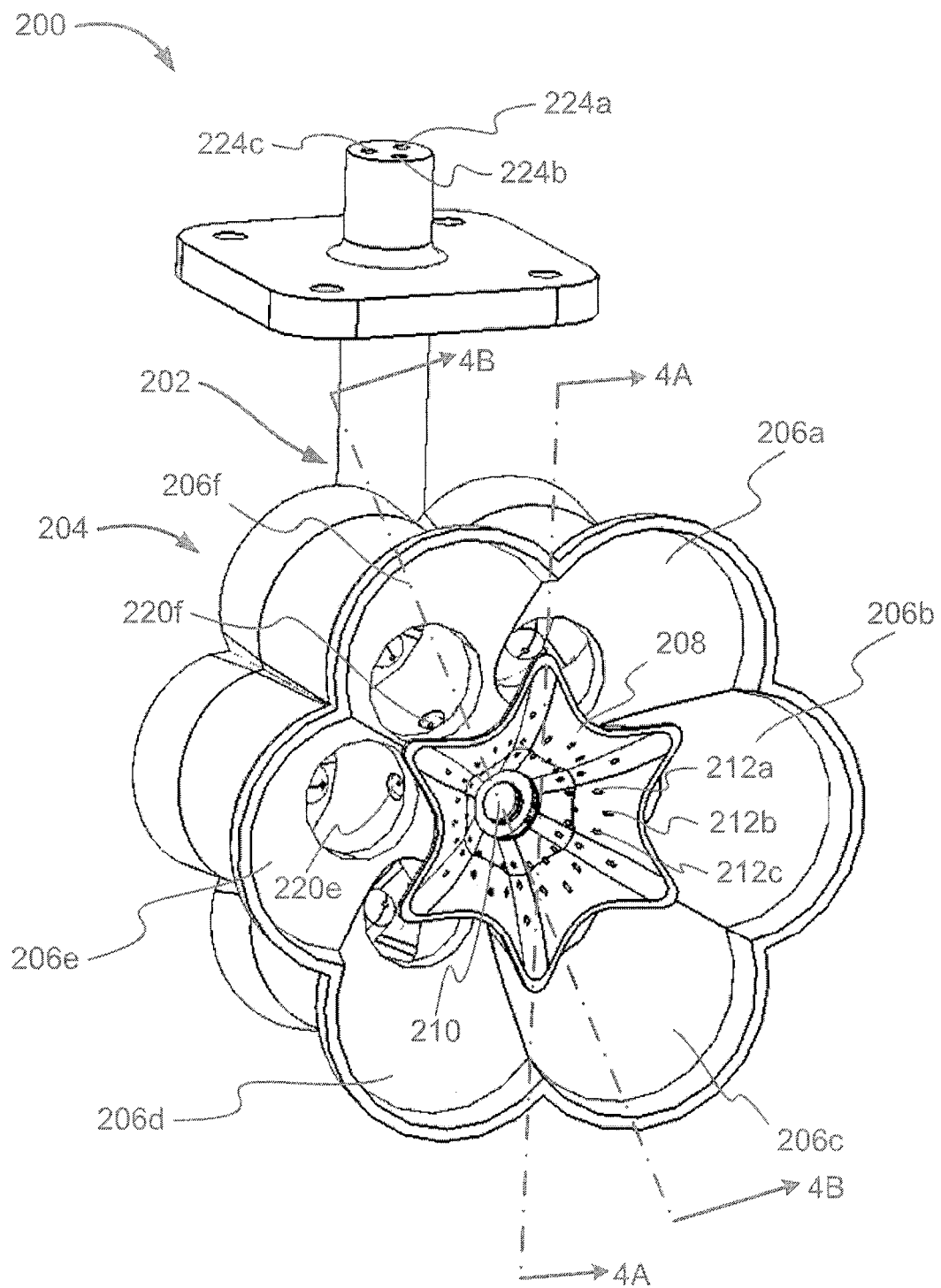
FIG. 2A is a front perspective view of an example gas turbine combustor sub-assembly, including a fuel/air mixer assembly and fuel injector assembly.
Figure 2B:
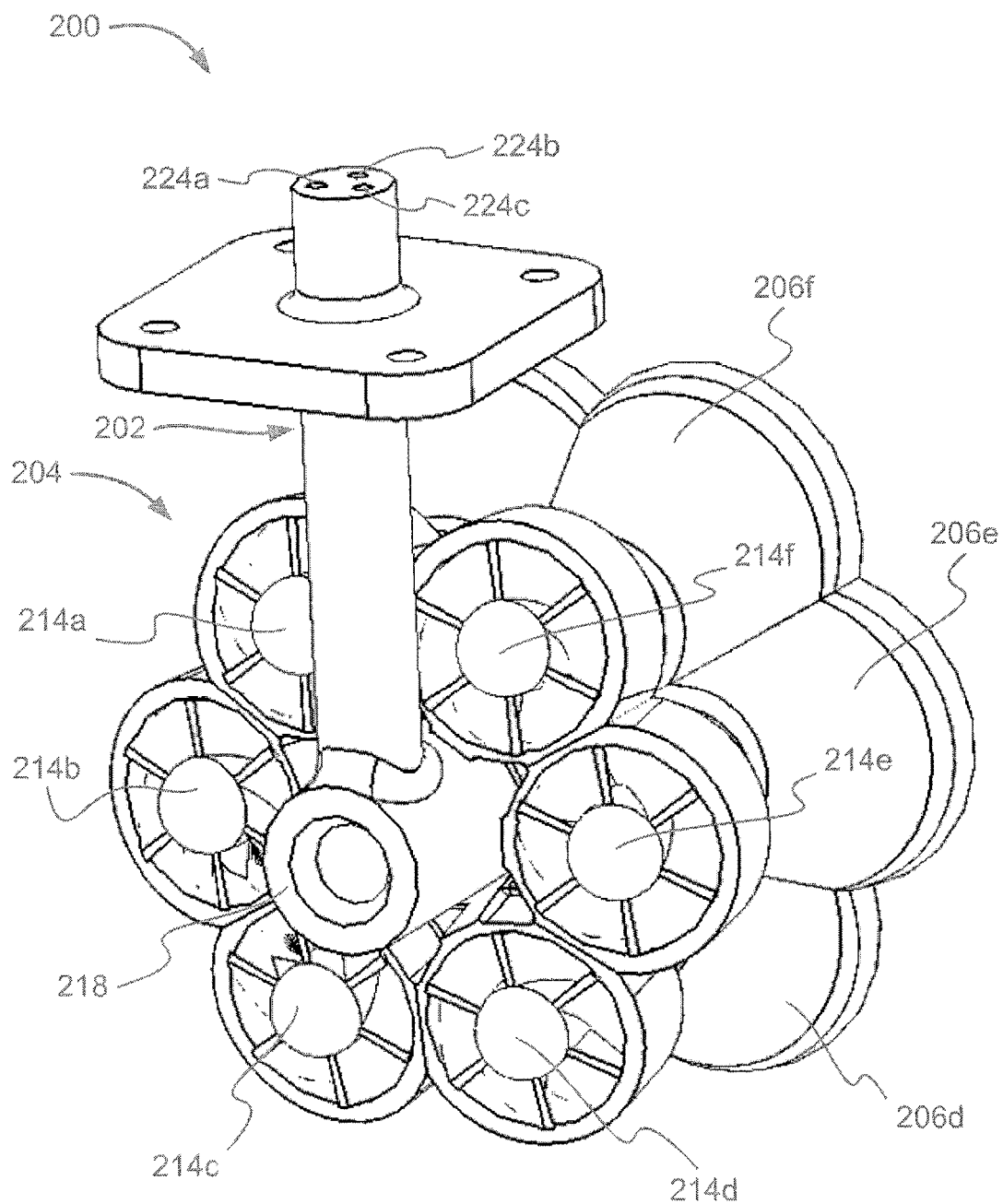
FIG. 2B is a rear perspective view of the example gas turbine combustor sub-assembly of FIG. 2A.

FIG. 2A and FIG. 2B are front and rear perspective views, respectively, of an example gas turbine combustor sub-assembly 200. The example turbine combustor sub-assembly 200 mixes air and fuel and enables combustion of the air/fuel mixture within a combustor. Multiple of the sub-assemblies 200 are arranged together to form a combustor assembly. The turbine combustor sub-assembly 200 can be implemented in a gas turbine engine such as gas turbine engine 10 shown in FIG. 1. The example gas turbine combustor sub-assembly 200 includes an example fuel injector 202 and an example fuel/air mixer assembly 204. The mixer assembly 204 includes a plurality of mixer elements 206a, 206b, 206c, 206d, 206e, 206f and a center element 208. In other implementations, the mixer assembly 204 can include more or fewer mixer elements. In the example fuel/air mixer assembly 204, the mixer elements 206a, 206b, 206c, 206d, 206e, 206f are affixed to each other as well as to the center element 208 and located symmetrically around the center element 208, equidistant from a center location. The mixer elements 206a-f can be located in other configurations (e.g. asymmetrically). The mixer assembly 204 can be coupled to the fuel injector (e.g. fuel injector 104) to be carried with the fuel injector or it can be coupled to a combustor dome (e.g. dome 106) and the injector subsequently coupled to the mixer assembly 204. In some cases, the mixer elements 206a-f are coupled to the dome plate (not shown) of the dome 106.

The example mixer elements 206a-f define internal swirl passages that facilitate the mixing of air and fuel for combustion. In the example fuel/air mixer assembly 204, the example mixer elements 206a-f are conical-cylindrical-conical, converging-diverging venturis. In other implementations, the mixer elements 206a-f can be venturis with a different shape or in a different configuration. In other implementations, the mixer elements 206a-f need not be venturis and can include passages of a different shape or in a different configuration. The mixer elements 206a-f each include an air swirler 214a-f, respectively. The air swirlers 214a-f are located within the passages and impart a swirling motion on the incoming air that facilitates the mixing of air and fuel. In the example mixer assembly 204 the air swirlers are axial fans, though other configurations or types of air swirlers can be used.

The center element 208 defines a central mixer passage 210 that enables mixing of airflow and fuel. Fuel is fed from the fuel injector assembly 202 into the central mixer passage 210 and the fuel/air mixture from the central mixer passage 210 is combusted. In some implementations, the back surface of the center element 208 defines a flame holder. The fuel/air mixture output from the mixer elements 206a-f can be ignited by a standing flame held in place by the back surface of center element 208. The center element 208 includes a plurality of cooling air passages. (e.g. cooling air passages 212a, 212b, 212c, among others). The airflow through the cooling passages helps maintain the center element 208 within acceptable temperatures for the materials of the element. Furthermore, the airflow from the cooling air passages mixes with the fuel output from the central mixer passage 210.

Figure 3:
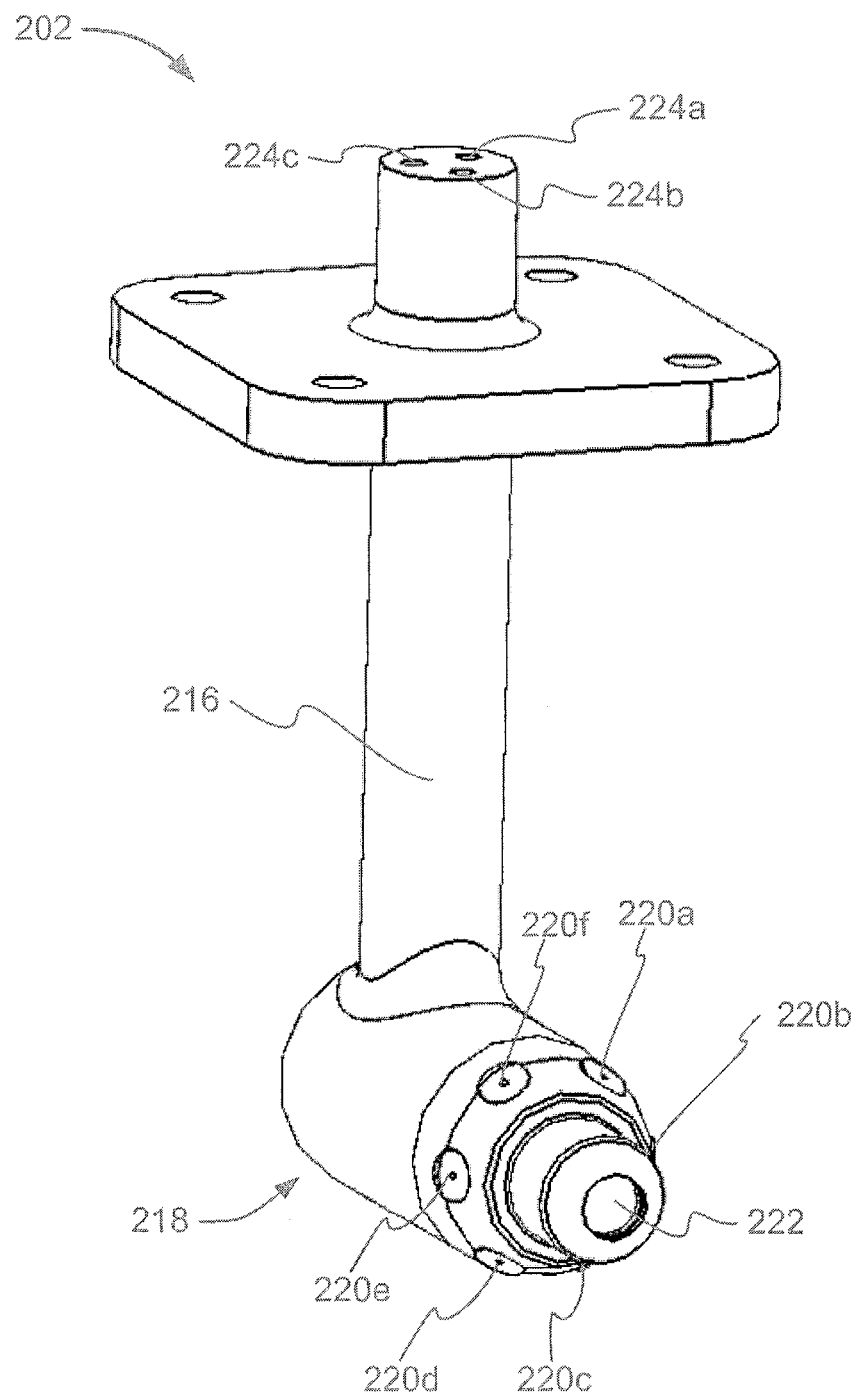
FIG. 3 is a front perspective view of an example fuel injector assembly.

FIG. 3 shows a front perspective view of the example fuel injector assembly 202 of FIG. 2A and FIG. 2B. The fuel injector assembly 202 includes a stem 216 with a securing flange and an example tip portion 218. The tip portion 218 includes the extreme tip of the fuel injector. The tip portion 218 includes multiple peripheral fuel orifices 220a-f and a central orifice 222. The tip portion 218 can be a single tube having a cylindrical shape or some other shape. The tip portion 218 includes one or more internal passages that feed fuel to the orifices 220a-f, 222.

The peripheral orifices 220a-f and central orifice 222 spray or inject liquid or gaseous fuel, and/or other fluids such as water or steam into the airflow of mixer assembly 204. The orifices 220a-f and 222 can be designed to produce a specified spray pattern, for example to produce a jet, a hollow or solid cone, or another specific shape (e.g., fan or other shape). The peripheral orifices 220a-f are located around the tip portion 218, oriented radially outward, such that each peripheral orifice 220a-f is positioned in the sidewall of a mixer element 206a-f (c.f. FIG. 2A). The peripheral orifices 220a-f are configured to spray fuel into the airflow of associated mixer elements 206a-f, respectively. The central orifice 222 sprays fuel into the central mixer passage 210 and thus into the flow of center element 208. The plurality of orifices 220a-f and 222 enable the fuel injector assembly 202 to supply fuel to multiple mixer elements using only a single tip or tip portion. The orifices 220a-f and 222 can be orifice devices that thread or are otherwise installed into the tip portion 218, or the orifices can be integral in the sidewall of the tip portion 218 (e.g., machined, laser cut, or other).

The example fuel injector assembly 202 includes fuel feeds 224a-c that are internal passages or tubes within the stem 216 and the tip portion 218. The fuel feeds 224a-c are fluidly connected to the peripheral orifices 220a-f and central orifice 222. The fuel feeds 224a-c supply fuel to the orifices 220a-f and 222. In some implementations, the fuel feeds 224a-c can include annular passages within the tip portion 218. The fuel feeds 224a-c and the orifices 220a-f and 222 can be connected such that one fuel feed (e.g. 224a) supplies fuel to a subset or group of the orifices (e.g. 220a, 220c, 220e). Likewise, a separate fuel feed (e.g. 224b) can supply fuel to another subset or group of the orifices (e.g. 220b, 220d, 220f). The central orifice 222 can also have its own fuel feed (e.g. 224b). The fuel feeds and orifices can be connected in this configuration or another configuration, and more or fewer fuel feeds or orifices can be used. In this manner, the example fuel injector assembly can selectively supply or not supply fuel to a first group of orifices (and thus a first group of mixer elements) and to a second group of orifices (and thus a second group of mixer elements) independently, thus enabling staging the mixer elements to produce different combustion conditions. The fuel injector assembly can be designed to separately control any number of groups of orifices. The fuel injector assembly can thus be a staged system designed to supply fuel independently to different groups of orifices and mixer elements.

Figure 4A:
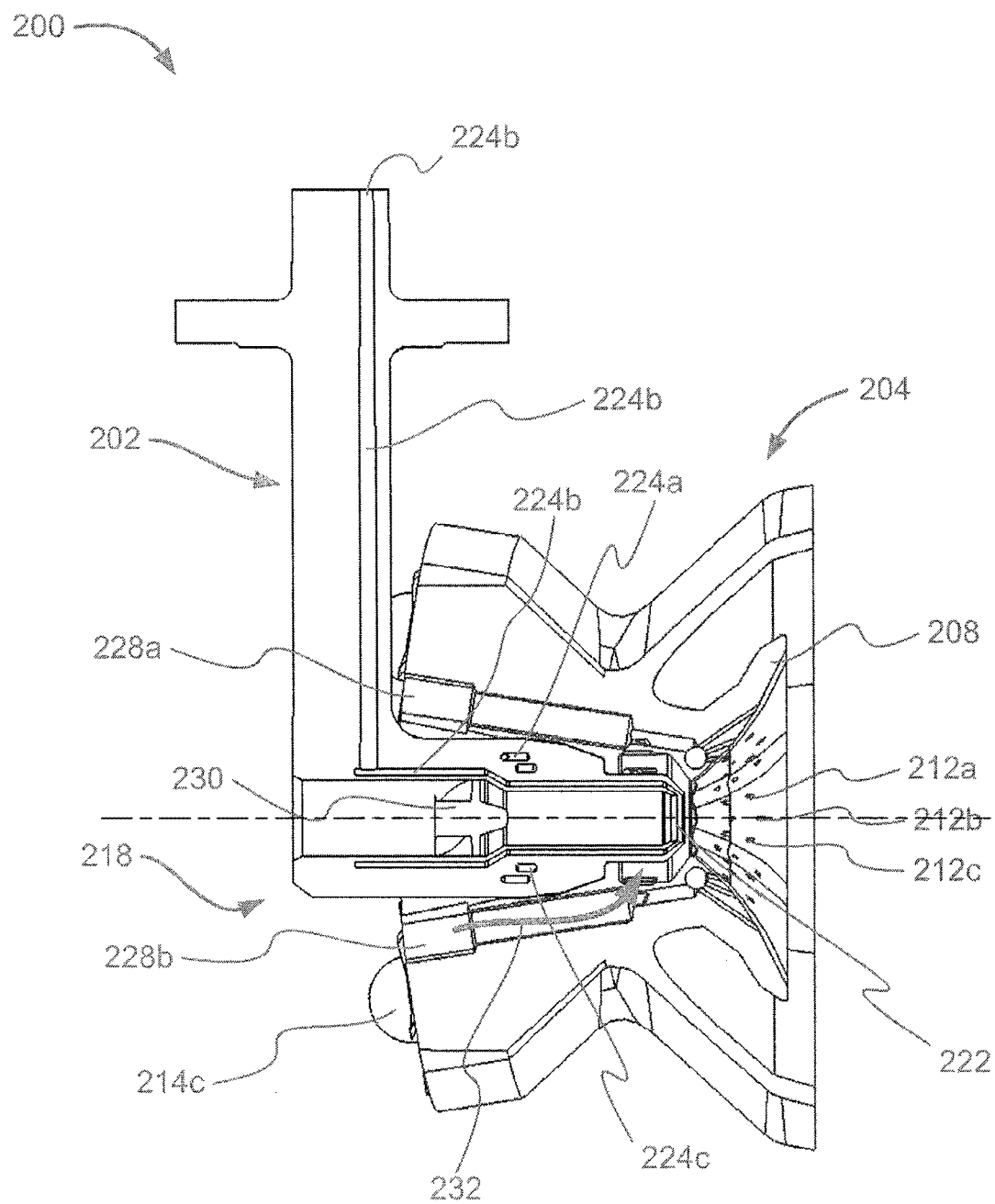
FIG. 4A is half, side cross-sectional view of the example sub assembly of FIGS. 2A and 2B.
Figure 4B:
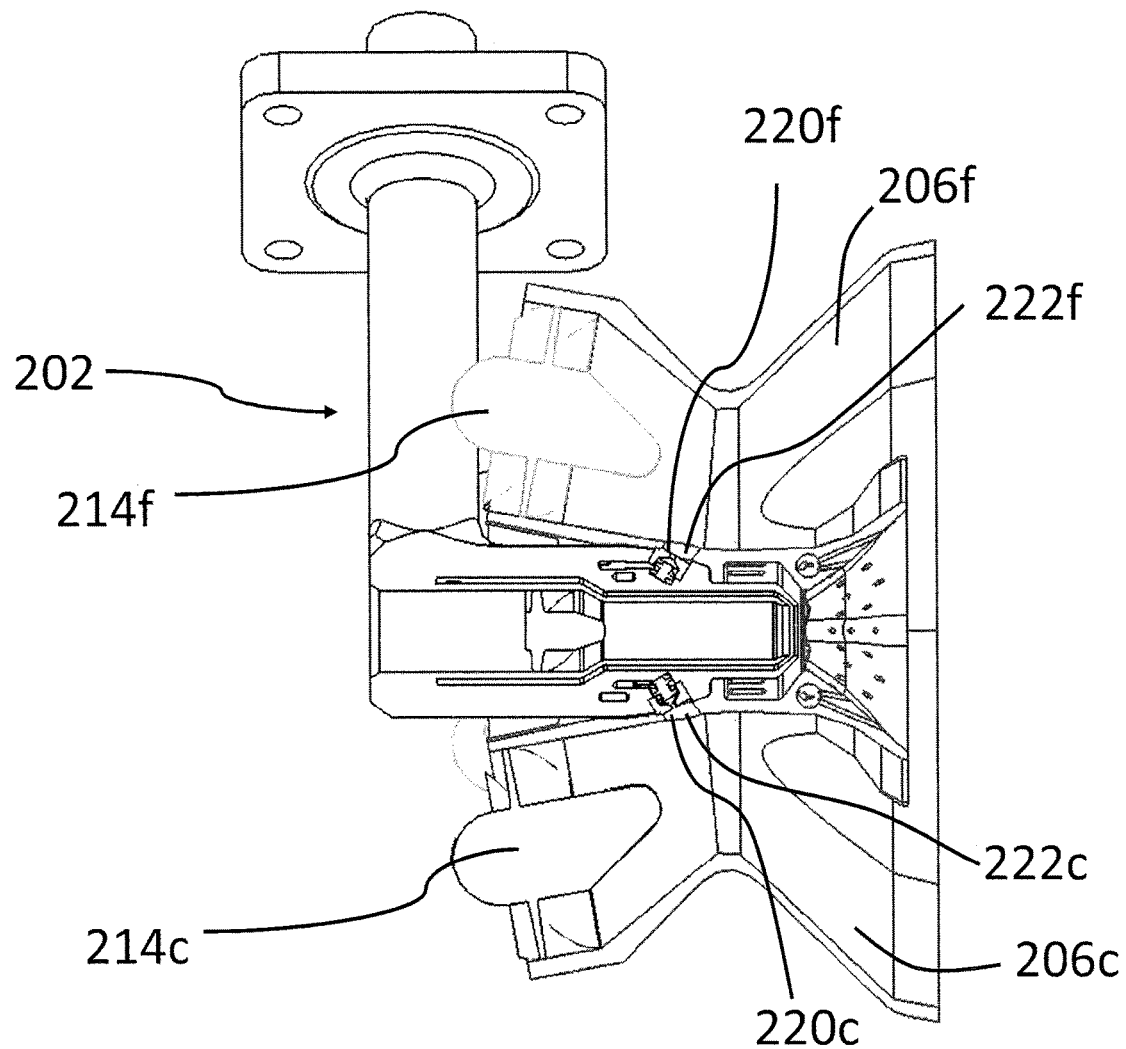
FIG. 4B is half, side cross-sectional view of the example sub assembly of FIGS. 2A and 2B.

FIG. 4A is a cross-section view of the example gas turbine combustor sub-assembly 200. The cross-section plane 4A-4A for FIG. 4A is shown in FIG. 2A. The cross-sectional view of FIG. 4A shows that the mixer assembly 204 includes example cooling air intake passages 228a, 228b. The air intake passages 228a, 228b are passages that allow airflow to enter the cooling air passages (e.g. 212a, 212b, 212c) in the center mixer element 208, and also provide the outer swirling air 232 for the air blast injector tip 222. The mixer assembly 204 can include more or fewer cooling air intake passages, and can be configured differently. FIG. 4 also shows an example air swirler 230 in the tip portion 218. The air swirler 230 is an axial fan that facilitates the inner swirling air to the airblast injector tip in the center element 208. In other configurations, a different type of swirler could be used. FIG. 4B is a cross-section view of 4B-4B shown in FIG. 2A. The peripheral pressure atomizing tips 220c and 220f are each aligned with an open port 222c, 222f in the sidewall of the peripheral mixer elements 206c, 206f to facilitate the fuel injection into the airflow streams in the mixer elements.

Figure 5A:
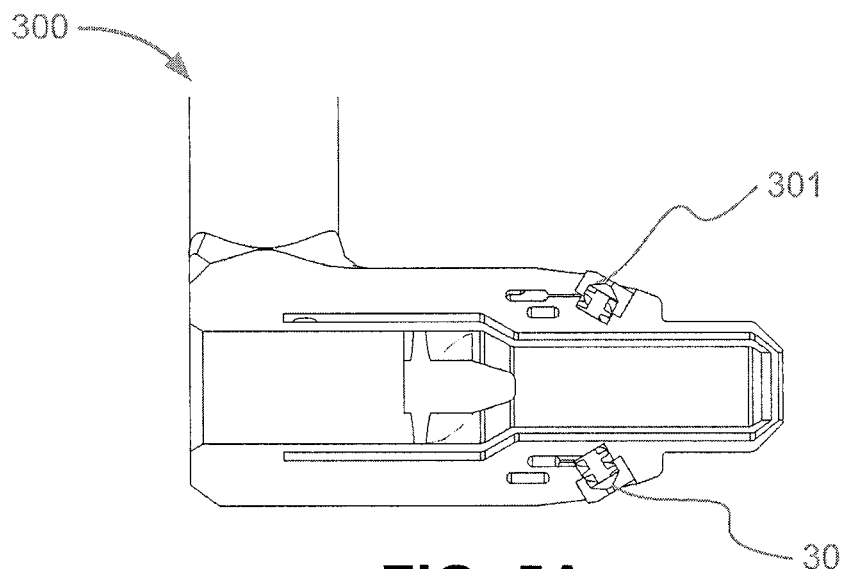
FIG. 5A is a detail half, side cross-sectional view of an example fuel injector tip.
Figure 5B:
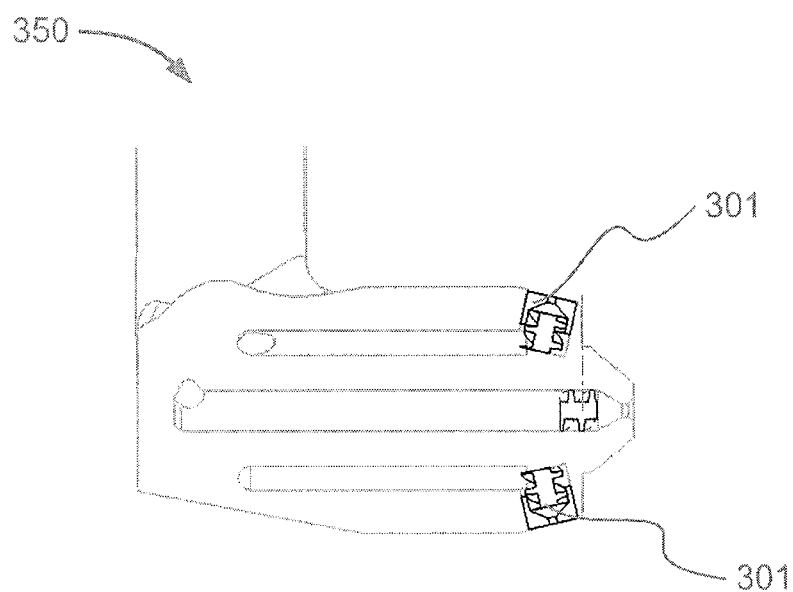
FIG. 5B is a detail half, side cross-sectional view of an example fuel injector tip.

FIG. 5A and FIG. 5B show cross-sections of two example types of fuel injector tips 300 and 350. The example fuel injectors 300 and 350 can be implemented in a fuel injector tip portion such as the tip portion 218 shown in FIGS. 2-4. FIG. 5A shows an air-blast type fuel injector tip 300 and the peripheral pressure atomizing injection tips 301. The example tip portion 218 of prior figures is shown including an air-blast type fuel injector tip like fuel injector tip 300. FIG. 2B shows a pressure atomizing type fuel injector tip 350. These and other types or combinations of fuel injector tips can be implemented in the tip portion described herein.

Figure 6:
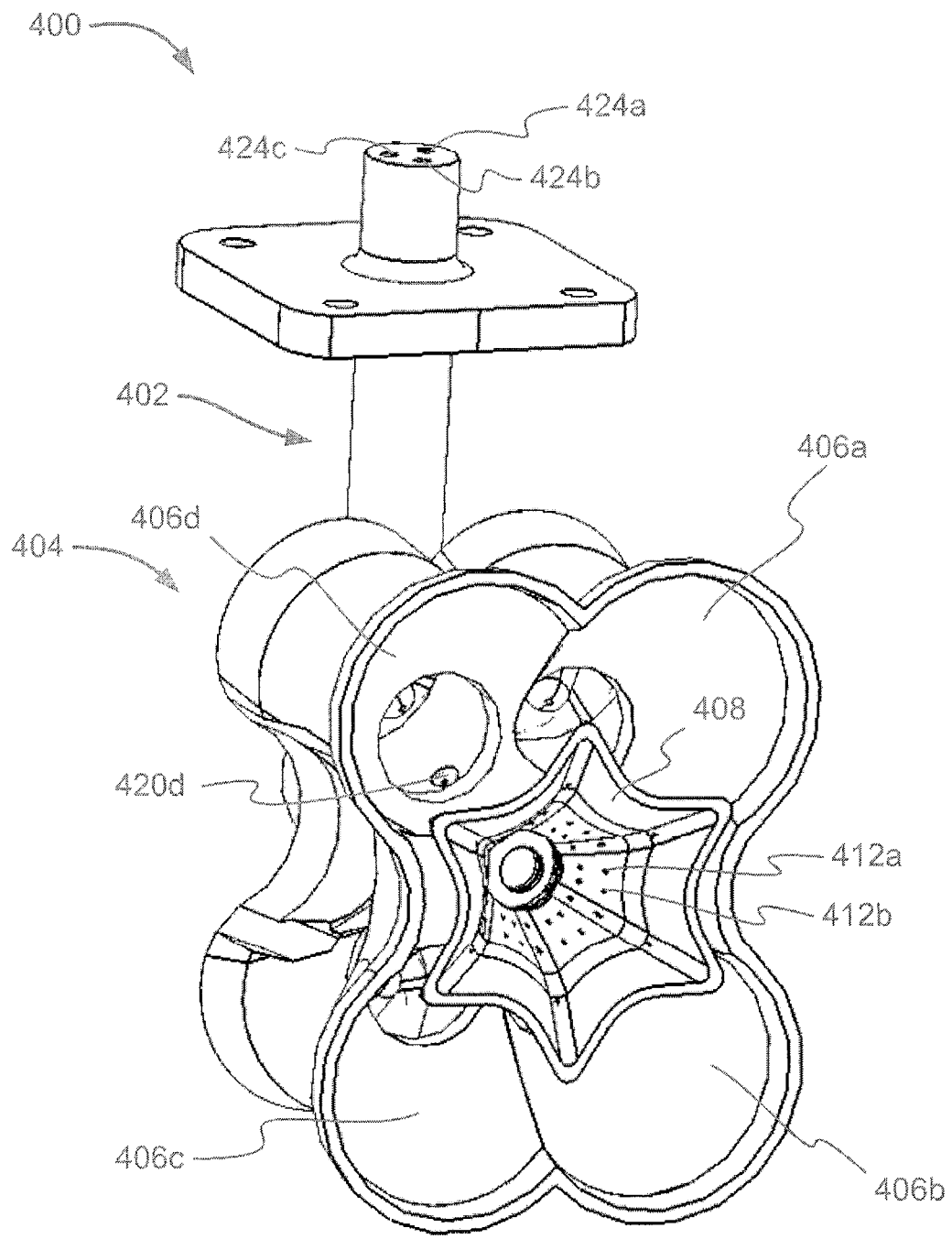
FIG. 6 is a front perspective view of another example gas turbine combustor sub-assembly.

FIG. 6 shows an example gas turbine combustor sub-assembly 400. The example gas turbine combustor sub-assembly 400 is substantially similar to the example gas turbine combustor sub-assembly 200 show previously. The example gas turbine combustor sub-assembly 400 includes an example fuel injector 402 and an example fuel/air mixer assembly 404. The mixer assembly 404 includes a plurality of mixer elements 406a, 406b, 406c, 406d, and a center element 408. The gas turbine combustor assembly 400 includes air cooling passages 412a, 412b and fuel or fluid feeds 424a-c. The gas fuel injector 402 includes multiple orifices (e.g. orifice 420d) that are configured to provide fuel to the mixer elements 406a-d and 408. The mixer assembly 404 includes five mixer elements (four symmetrically around and equidistant from a center element), whereas the previous mixer assembly 204 includes seven mixer elements. As discussed below, the mixer assembly 204 and mixer assembly 404 are arranged to nest together.

Figure 7:
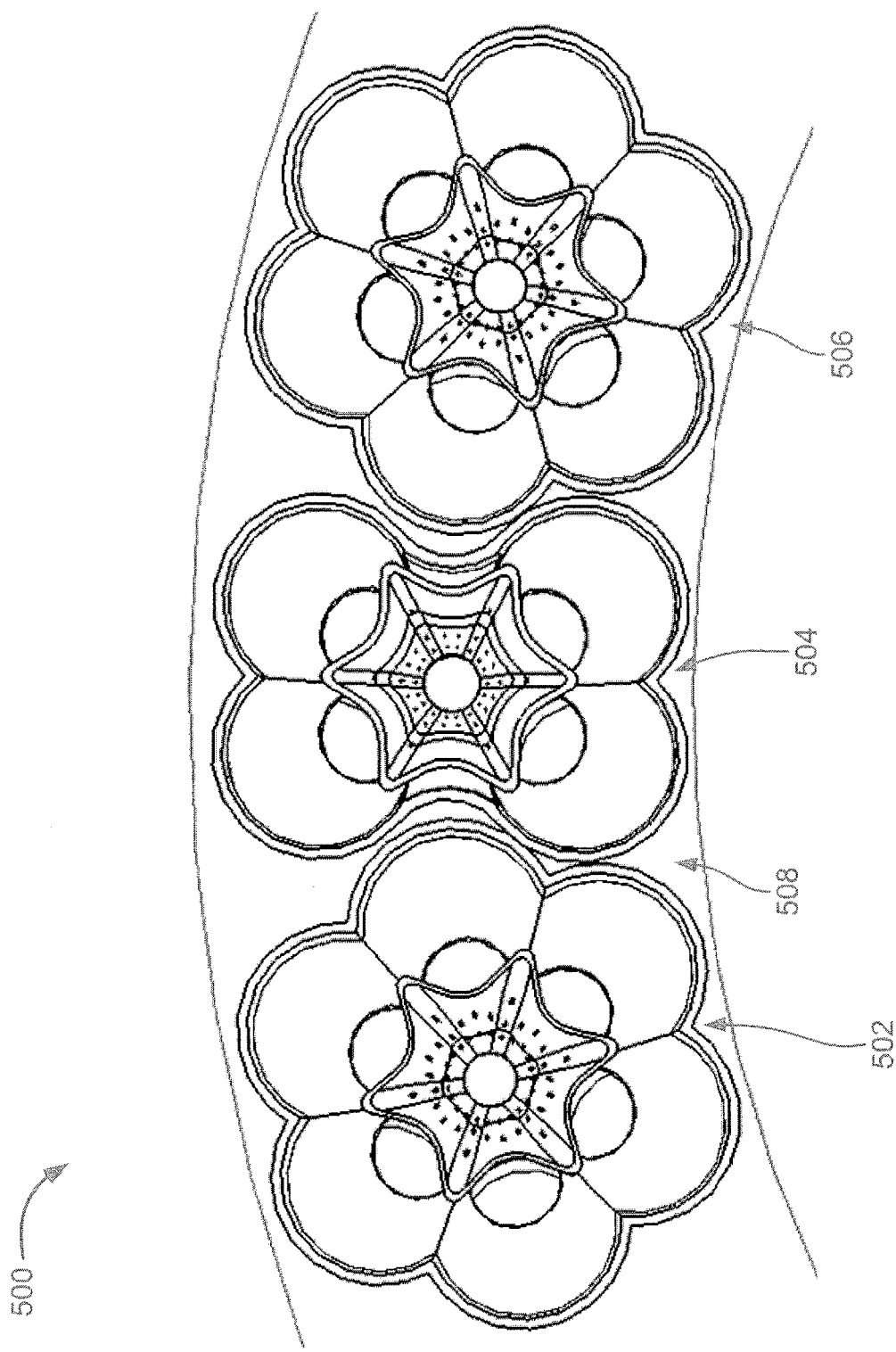
FIG. 7 is a view of a portion of an annular combustor assembly.

FIG. 7 shows a portion of an annular fuel injector assembly 500. The annular fuel injector assembly 500 is a collection of combustor sub-assemblies that have been positioned in an annular arrangement. In certain instances, the assembly 500 can include multiple concentric annular arrangements of combustor sub-assemblies. The portion of the annular fuel injector assembly 500 depicted shows three combustor sub-assemblies 502, 504, 506 behind a dome plate assembly 508. Mixer assemblies 502 and 506 are substantially similar to previously shown mixer assembly 204, and mixer assembly 504 is substantially similar to previously shown mixer assembly 404. The mixer elements, such as mixer elements 406a-d, are arranged in mixer assembly 504 such that a space is available to accommodate a protruding mixer element, such as the elements 206b and 206e, on mixer assemblies 502 and 506. As such, a combination of mixer assemblies 204 and mixer assemblies 404 can be tiled or nested to fill a space, as shown in FIG. 7. In some implementations, multiple arrangements of annular fuel injector assemblies can be used. In some implementations, the mixer elements can be arranged to fill a space other than an annulus (for example, a circular space). The mixer assemblies can also have different arrangements of mixer elements such that the mixer assemblies nest differently than shown.

Figure 8A:
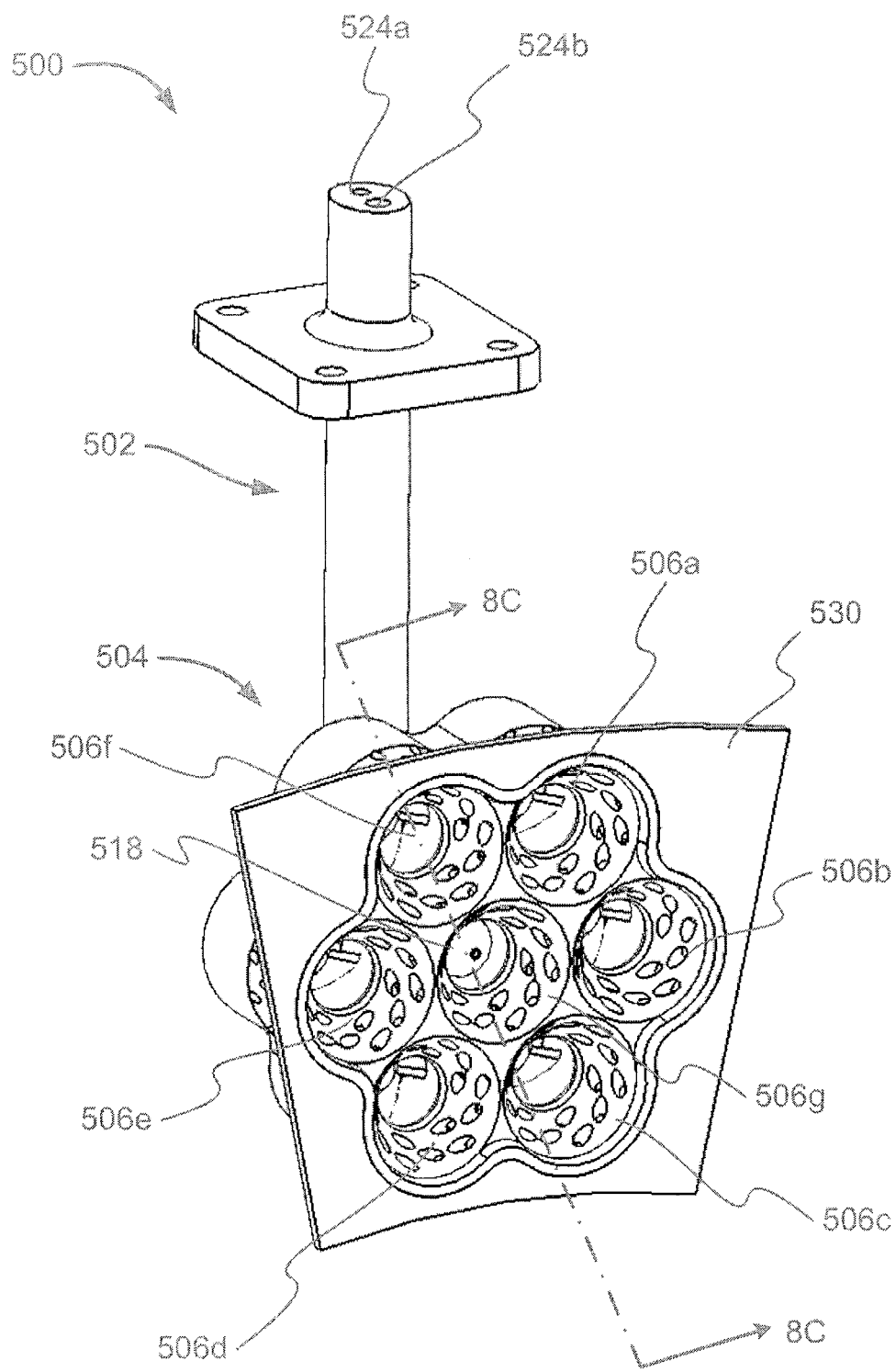
FIG. 8A is a front perspective view of another example gas turbine combustor sub-assembly.
Figure 8B:
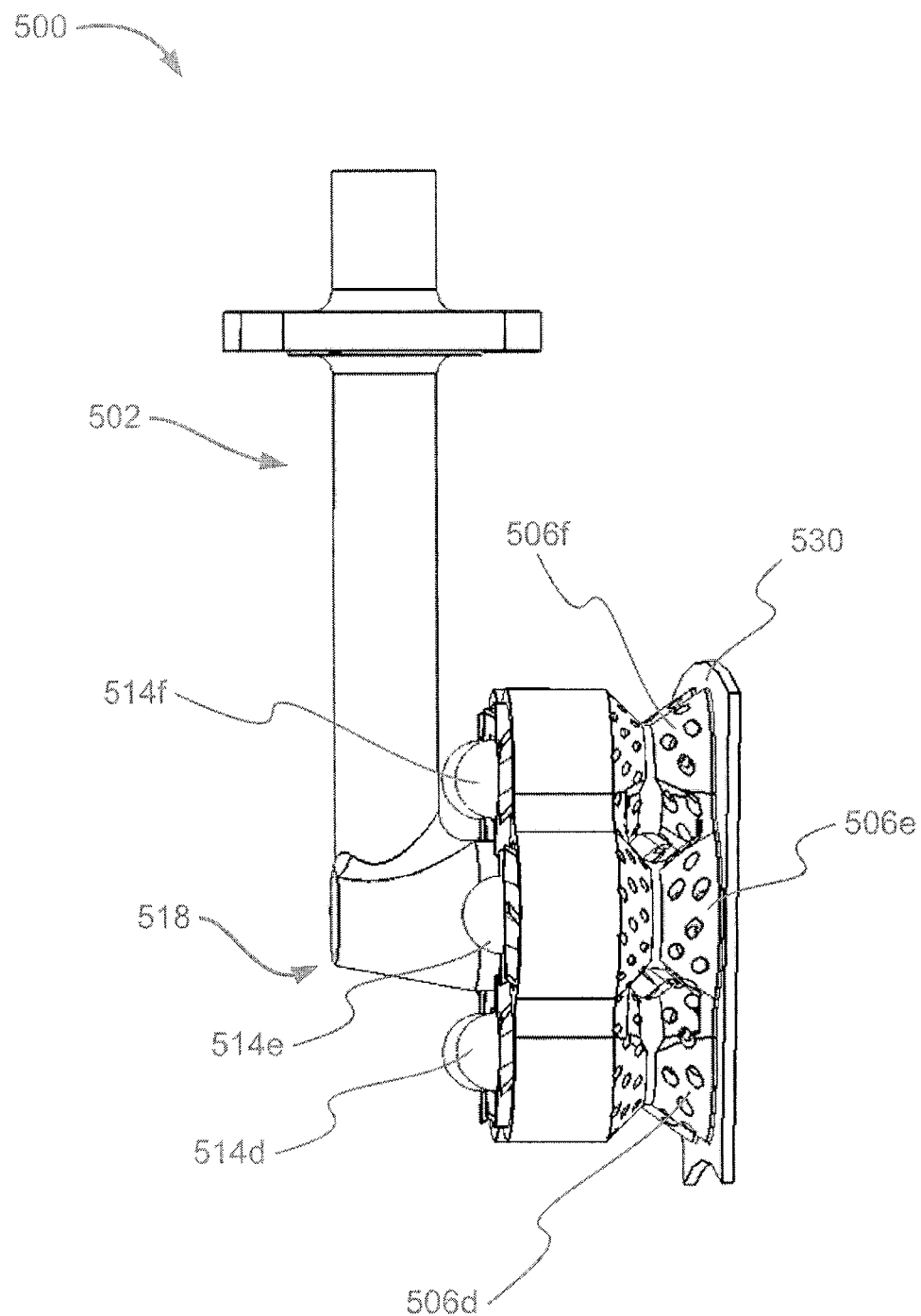
FIG. 8B is a side view of the example gas turbine combustor sub-assembly of FIG. 8A.
Figure 8C:
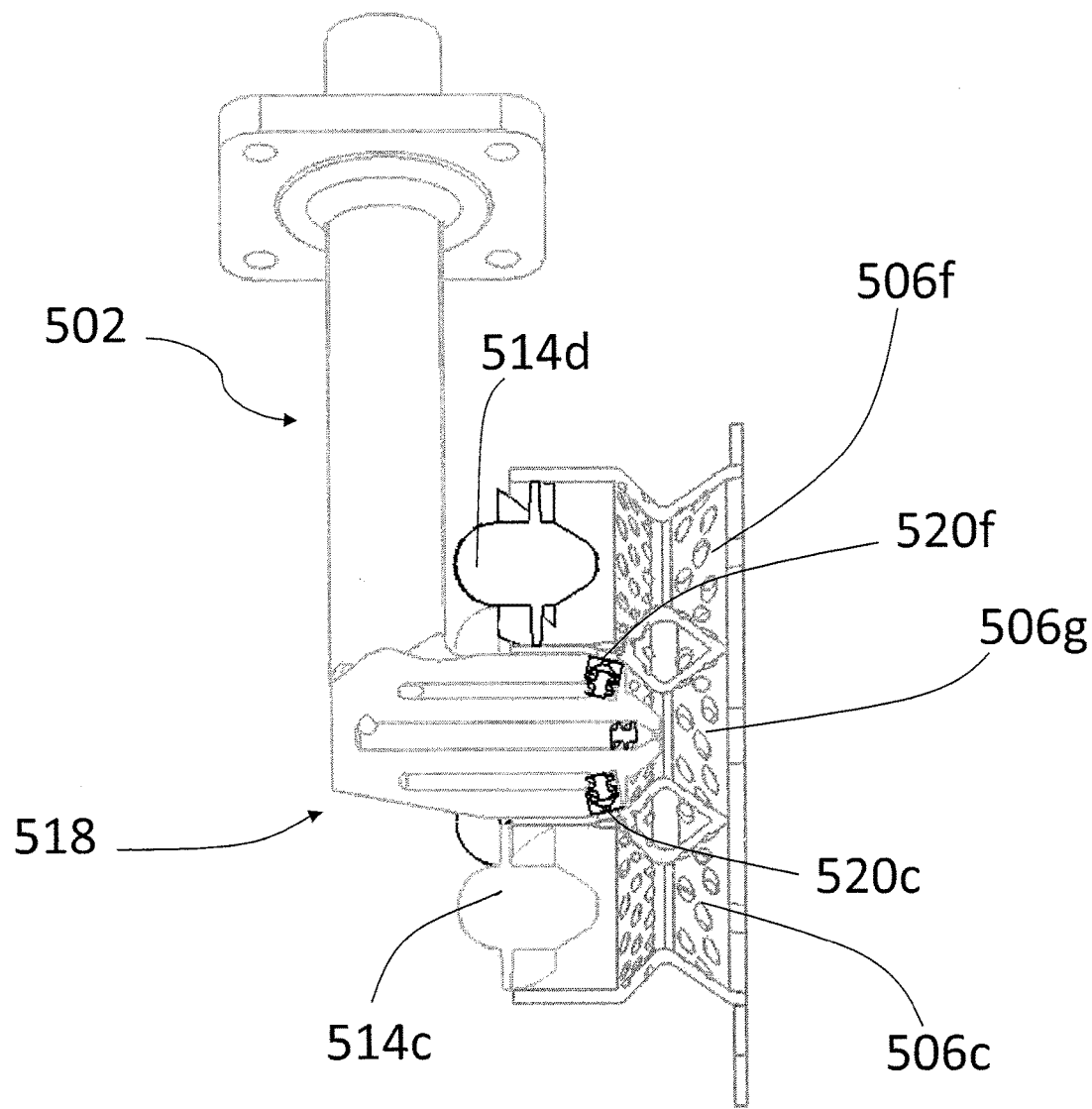
FIG. 8C is half, side cross-sectional view of the example subassembly of FIGS. 8A and 8B.

FIG. 8A, FIG. 8B, and FIG. 8C show another example gas turbine combustor sub-assembly 500. The combustor sub-assembly 500 is similar to the example gas turbine combustor sub-assembly 200 shown in FIG. 2-4. The combustor sub-assembly 500 includes a fuel injector assembly 502 and a mixer assembly 504. The fuel injector assembly 502 includes multiple fuel feeds 524a and 524b and an injector tip portion 518. The mixer assembly 504 includes mixer elements 506a-g. As with combustor sub-assembly 200, a single fuel injector 202 with a single tip portion 518 is used to supply fuel to multiple mixer elements. The example mixer assembly 500 is coupled to a dome plate 530. The dome plate 530 is a section of the dome of a combustor, such as dome 106 shown in FIG. 1. The injector tip portion 518 can contain multiple orifices to direct fuel into the airflow of each mixer element 506a-g. In this example, the fuel injector tip portion 518 uses a pressure-atomizing design, though other fuel injector tip types can be used. The mixer assembly can have more or fewer mixer elements, and the mixer elements may be configured or arranged so as to nest next to other mixer elements or mixer assemblies.

The mixer elements 506a-g define venturis or passages that direct airflow into the combustor and promote fuel/air mixing. Each mixer element 506a-g includes a plurality of angled air holes in its walls. The angled air holes provide mixer element wall cooling and additional swirling airflow for fuel/air mixing. The angled air holes can have a symmetrical arrangement as shown or have another arrangement. The angled air holes can also be located at different locations on the passages of the mixer elements. The mixer elements 506a-g can also include air swirlers 514a-g (e.g. axial fans) located within the passages to further promote fuel/air mixing.

Notably, the concepts herein have been discussed in connection with a combustor and sub-assemblies for a gas turbine engine. However, they are not so limited. For example, the same concepts could be applied to other forms of engines, as well as other apparatus using combustors and/or combustion chambers.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A gas turbine combustor assembly, comprising:
a fuel/air mixer assembly comprising a plurality of fuel/air mixer elements including a center fuel/air mixer element and multiple peripheral fuel/air mixer elements arranged around the center fuel/air mixer element, each of the peripheral fuel/air mixer elements comprising a housing having a sidewall defining an air flow passage and an air swirler residing in the air flow passage, the sidewall of the housing comprising a fuel port opening to the air flow passage at a location axially downstream of the air swirler; and
a fuel injector coupled to the fuel/air mixer assembly, the fuel injector having a tip portion comprising a single unitary structure at the furthest distal end of the fuel injector, the tip portion having a plurality of fuel outlets including an axially oriented center fuel outlet and multiple radially oriented peripheral fuel outlets arranged around the center fuel outlet, the center fuel outlet arranged to inject fuel directly into the center fuel/air mixer element, each of the peripheral fuel outlets arranged to inject fuel directly into a respective fuel port of each of the peripheral fuel/air mixer elements, the center fuel outlet configured to produce a first spray pattern, and the peripheral fuel outlets configured to produce a second spray pattern that is different from the first spray pattern.

2. The gas turbine combustor assembly of claim 1, wherein the fuel injector is separably coupled to the fuel/air mixer assembly.

3. The gas turbine combustor assembly of claim 1, wherein the air swirler of at least one of the multiple peripheral fuel/air mixer elements comprises an axial fan.

4. The gas turbine combustor assembly of claim 1, wherein the fuel injector comprises a plurality of fuel feeds, each fuel feed configured to supply a flow of fuel to one or more of the plurality of fuel outlets, and wherein the center fuel outlet and one or more of the peripheral fuel outlets are configured to receive fuel from separate fuel feeds.

5. The gas turbine combustor assembly of claim 1, wherein the center fuel outlet comprises an air-blast injector and at least one of the peripheral fuel outlets comprises an atomizing injector.

6. The gas turbine combustor assembly of claim 5, wherein the fuel injector comprises an axial fan air swirler.

7. The gas turbine combustor assembly of claim 1, wherein the center fuel/air mixer element comprises a plurality of cooling air passages distributed along a portion of the sidewall.

8. The gas turbine combustor assembly of claim 1, wherein the center fuel/air mixer element comprises a flame holder for supporting a standing flame that ignites mixed fuel/air output from one or more of the plurality of fuel/air mixer elements.

9. The gas turbine combustor assembly of claim 1, wherein the housing of at least one of the multiple peripheral fuel/air mixer elements comprises a Venturi structure having a converging portion and a diverging portion, and wherein the fuel port opening is located axially upstream of the diverging portion of the housing.

10. The gas turbine combustor assembly of claim 1, wherein the multiple peripheral fuel/air mixer elements reside in a symmetrical arrangement around the center fuel/air mixer element.

11. A method, comprising:
receiving fuel at a fuel injector tip portion of a gas turbine combustor injector, the tip portion comprising a single unitary structure and having a plurality of fuel outlets including an axially oriented center fuel outlet and multiple radially oriented peripheral fuel outlets arranged around the center fuel outlet, the center fuel outlet configured to produce a first spray pattern, and the peripheral fuel outlets configured to produce a second spray pattern that is different from the first spray pattern;

injecting the fuel from the plurality of fuel outlets of the tip portion into a plurality of fuel/air mixer elements, where fuel in the first spray pattern produced by the center fuel outlet is injected axially into a center fuel/air mixer element and fuel in the second spray pattern produced by the peripheral fuel outlets is injected radially into multiple peripheral fuel/air mixer elements arranged around the center fuel/air mixer element, each of the peripheral fuel/air mixer elements comprising a housing containing an air swirler and a fuel port residing axially downstream of the air swirler that receives fuel directly from a respective one of the peripheral fuel outlets;

receiving a flow of air with at least one of the multiple peripheral fuel/air mixer elements;

directing the flow of air across the air swirler of at least one of the multiple peripheral fuel/air mixer elements as fuel is received through the fuel injector port; and mixing the air and fuel within the housing.

12. The method of claim 11, wherein injecting the fuel from the injector tip portion into the plurality of fuel/air mixer elements, comprises directing the fuel from the injector tip portion residing at a center location into the multiple peripheral fuel/air mixer elements arranged around the center location.

13. The method of claim 11, wherein receiving fuel at the fuel injector tip portion of the gas turbine combustor injector comprises receiving fuel through a first fuel feed fluidically coupled to a first subset of fuel outlets and a second fuel feed fluidically coupled to a second subset of fuel outlets that is different from the first subset, the first subset including the center fuel outlet and the second subset including one or more of the second fuel outlets, and wherein injecting the fuel from the injector tip portion into a plurality of fuel/air mixer elements comprises directing fuel into a subset of the plurality of fuel/air mixer elements using the first fuel feed while preventing fuel flow through the second fuel feed into a second subset of outlets.

14. A device, comprising:

a fuel/air mixer assembly comprising a plurality of fuel/air mixer elements including a center fuel/air mixer element and multiple peripheral fuel/air mixer elements arranged around the center fuel/air mixer element, each of the peripheral fuel/air mixer elements comprising a housing having a sidewall defining an air flow passage, the sidewall of the housing comprising a fuel port opening to the air flow passage; and a fuel injector separably coupled to the fuel/air mixer assembly, the fuel injector having a tip portion comprising a single unitary structure at the furthest distal end of the fuel injector, the tip portion having a plurality of fuel outlets including an axially oriented center fuel outlet and multiple radially oriented peripheral fuel outlets arranged around the center fuel outlet, the center fuel outlet arranged to inject fuel directly into the center fuel/air mixer element, each of the peripheral fuel outlets arranged to inject fuel directly into a respective fuel port of each of the peripheral fuel/air mixer elements, the center fuel outlet configured to produce a first spray pattern, and one or more of the peripheral fuel outlets configured to produce a second spray pattern that is different from the first spray pattern.

15. The device of claim 14, wherein the fuel injector comprises a plurality of fuel feeds, each fuel feed configured to supply a flow of fuel to one or more of the plurality of fuel outlets, and wherein the center fuel outlet and one or more of the peripheral fuel outlets are configured to receive fuel from separate fuel feeds.

16. The device of claim 14, wherein the center fuel outlet comprises an air-blast injector and at least one of the peripheral fuel outlets comprises an atomizing injector.

17. The device of claim 16, wherein the fuel injector comprises an axial fan air swirler.

18. The device of claim 14, wherein the center fuel/air mixer element comprises a plurality of cooling air passages distributed along a portion of the sidewall, and wherein the center fuel/air mixer element comprises a flame holder for supporting a standing flame that ignites mixed fuel/air output from one or more of the plurality of fuel/air mixer elements.

19. The device of claim 14, wherein the housing of at least one of the multiple peripheral fuel/air mixer elements comprises a Venturi structure having a converging portion and a diverging portion, and wherein the fuel port opening is located axially upstream of the diverging portion of the housing.

20. The device of claim 14, wherein the multiple peripheral fuel/air mixer elements reside in a symmetrical arrangement around the center fuel/air mixer element.

* * * * *